United States Patent

[11] 3,595,258

| [72] | Inventor | Hans-Dieter Kinner<br>Attleboro, Mass. |
|---|---|---|
| [21] | Appl. No. | 666,340 |
| [22] | Filed | Sept. 8, 1967 |
| [45] | Patented | July 27, 1971 |
| [73] | Assignee | The Foxboro Company<br>Foxboro, Mass. |

[54] FLUIDIC GATE ELEMENT
3 Claims, 6 Drawing Figs.

| [52] | U.S. Cl. | 137/81.5 |
|---|---|---|
| [51] | Int. Cl. | F15c 1/18 |
| [50] | Field of Search | 137/81.5 |

[56] References Cited
UNITED STATES PATENTS

| 3,468,329 | 9/1969 | Mayer | 137/81.5 |
|---|---|---|---|
| 3,182,674 | 5/1965 | Horton | 137/81.5 |
| 3,185,166 | 5/1965 | Horton et al. | 137/81.5 |
| 3,234,955 | 2/1966 | Auger | 137/81.5 |
| 3,336,931 | 8/1967 | Fox et al. | 137/81.5 |
| 3,362,421 | 1/1968 | Schaffer | 137/81.5 |
| 3,390,693 | 7/1968 | Ziemer et al. | 137/81.5 |
| 3,398,758 | 8/1968 | Unfried | 137/81.5 |
| 3,401,710 | 9/1968 | Keto | 137/81.5 |
| 3,403,563 | 10/1968 | Bowles | 137/81.5 UX |

Primary Examiner—Samuel Scott
Attorney—David E. Hoppe

ABSTRACT: A fluidic gate has a first flow conduit communicating through a chamber to a second flow conduit, with both flow conduits being aligned on a common central axis and with each conduit being individually shorter than the length required for production of a laminar flow therethrough over the flow rates of interest, but said first and second flow conduits having a total serial length otherwise sufficient for production of a laminar flow; a control access communicates with said chamber; a receiver conduit is axially aligned downstream of the combination of chamber and conduits; over the flow rates of interest, a suitable control pressure supplied by means of said control access to said chamber operates to switch the projected flow from said conduit and chamber combination between laminar and turbulent conditions, thereby registering logical one and zero states respectively at said receiver conduit; generally, a specific range of positive control pressures produces a laminar condition of projected flow.

PATENTED JUL 27 1971

INVENTOR.
HANS-DIETER KINNER

BY David E. Hoppe

ATTORNEY

FLUIDIC GATE ELEMENT

This invention relates to fluidic elements, and more particularly to fluidic elements having an output switched by a control signal.

This invention, briefly stated consists of two flow tubes communicating through an enlarged chamber, the combination being aligned on a mutual central axis, with each tube individually too short for production of laminar flow therethrough over the flow rates of interest, but with the combined serial length of the two tubes when considered connected by the chamber being sufficient to produce a laminar flow from the entire combination. With a source of supply fluid furnished to one of the flow tubes, flow is projected from the other tube, which projected flow is sensed by a receiver tube placed downstream from the combination of chamber and conduits. The projected flow sensed thereby may be either in a laminar or turbulent condition according to the operating pressure maintained in the enlarged chamber; the chamber pressure may be controlled through an access into said chamber, the control being effectuated by either a valvular restriction of said access, or by means of a signal pressure communicated through said access into said chamber.

The fluidic gate element of the invention provides a logical OR gate function, in which the application of a signal representing a logical ONE to the control access results in the sensing of an output also representing a logical ONE at the receiver tube of the fluidic gate element. This gating function is achieved by a structurally simple fluidic element, which may be easily manufactured in large numbers. The element yields a conveniently large change in output signal from a relatively small change in control signal.

These and other advantages of the invention will be in part apparent from the specification below and in part from the several Figures herewith, in which.

Figure 1:
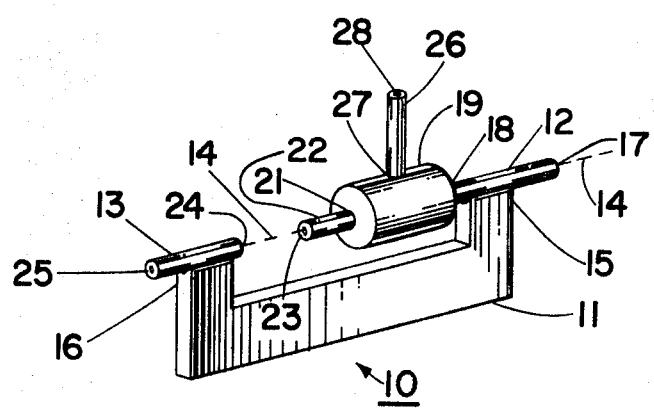
FIG. 1 is a three-dimensional view of an embodiment of the fluidic gate element of the invention.

Referring to FIG. 1, fluidic element 10 has base supporting member 11 holding inlet flow conduit 12 in alignment with receiver conduit 13 on central axis 14; conduits 12 and 13 being positioned at ends 15 and 16 respectively of supporting member 11. Upstream end 17 of conduit 12 is adapted to be supplied by a fluidic source. Downstream end 18 of conduit 12 fixedly supports a housing member 19, conduit 12 thereby communicating with chamber 20 enclosed by housing member 19. Supported at the downstream side 21 of housing 19 is conduit 22, which is thereby oriented on central axis 14; chamber 20 communicates with conduit 22. Flow derived from a fluidic source supplied to the inlet end 17 of conduit 12, passes through conduit 12 and through chamber 20 within housing 19, and thence through conduit 22 to be projected from downstream end 23 thereof, along central axis 14. A space intervenes between end 23 of conduit 22 and sensing end 24 of receiver 13, the space being adapted to provide for discrimination between sensing of a laminar condition and a turbulent condition of projected flow from conduit 22. The laminar condition produces a higher sensed pressure recovery at receiver conduit 13, which the turbulent condition produces a relatively low-pressure recovery at receiver conduit 13. Receiver conduit 13 supplies the gate output signal from end 25 thereof to appropriate associated circuits. A control access 26 is in communication with chamber 20, being connected through housing 19 at location 27 thereof. A control signal source may be suitably connected to end 28 of control tube 26.

Figure 2:
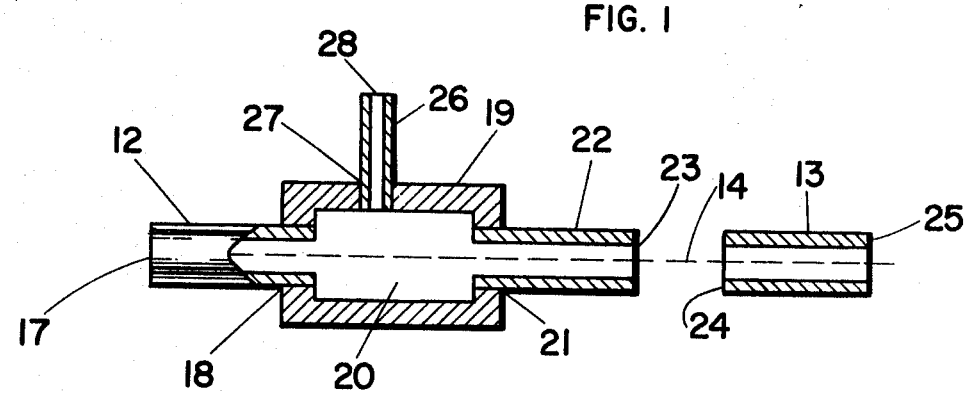
FIG. 2 is a cross-sectional view of an embodiment taken along the central axis thereof.

FIG. 2, a cross section along central axis 14, shows more clearly the relationship of chamber 20 within housing member 19 with conduit 12 and 22 communicating therewith. Chamber 20 encloses an enlarged volume compared with the cross-sectional areas of conduits 12 and 22 as taken on their diameters. The length of upstream conduit 12 and downstream conduit 22 are each individually too short to produce laminar flow therethrough over the Reynolds numbers of the intended flow applications. The total length of the conduits 12 and 22, between supply flow inlet 17 and projected flow outlet 23, however, is of a sufficient total length over the flow rates associated with the intended applications to allow the production of a laminar flow at flow projecting end 23 under suitable control conditions within chamber 20.

Control tube access 26 communicates with chamber 20 through a location at point 27 on housing 19, which location may be seen to be somewhat nearer the upstream side of chamber 20 than the downstream side thereof. It has been found that in some configurations the operation of fluidic gate 10 is improved by placing control access 26 upstream from the middle of chamber 20.

Figure 3:
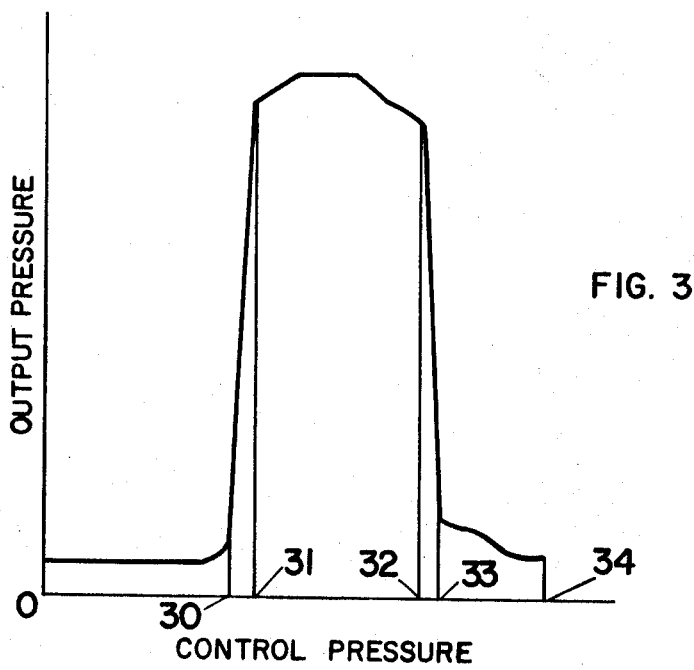
FIG. 3 is a graphical plot of control pressure versus output pressure for an embodiment of the invention.

Referring to FIG. 3, a plot of control pressure versus output pressure is shown for an illustrative operating supply pressure of 16 inches of water. It may be seen the output pressure is low, corresponding to a turbulent condition of projected flow, from a zero control pressure up to a relatively small positive control pressure corresponding to point 30. As control pressure is further increased from point 30 by a small amount, to point 31, the projected flow becomes laminar thereby producing a sharp rise in output pressure. The projected flow remains substantially in a laminar condition over a range of further increase in control pressure up to point 32. Thus, control pressures in the range between points 31 and 32 on the plot operate to produce a projected laminar flow from the conduit-chamber combination to receiver 13. A further positive increase in control pressure above point 32 results in turbulence upstream from sensing end 24, the affect becoming pronounced at control pressure point 33; a further increase in control pressure above point 33 to point 34 further reinforces the turbulent condition of operation upstream from receiver 13.

Thus it is observed that the range of control pressures between points 31 and 32 produce a laminar condition and thus a high output pressure signal, which may represent a logical ONE. Control pressures outside this range are associated with a turbulent condition, and thus a low output pressure which may represent a logical ZERO. Referring to the plot of FIG. 3, it may be seen that relatively small changes in control pressure serve to distinguish between the turbulent low output pressure condition and the laminar high output pressure condition. That is, the control pressure differential between points 30 and 31, as well as between points 32 and 33, is relatively small, thus representing a relatively sharp transition region.

Figure 4:
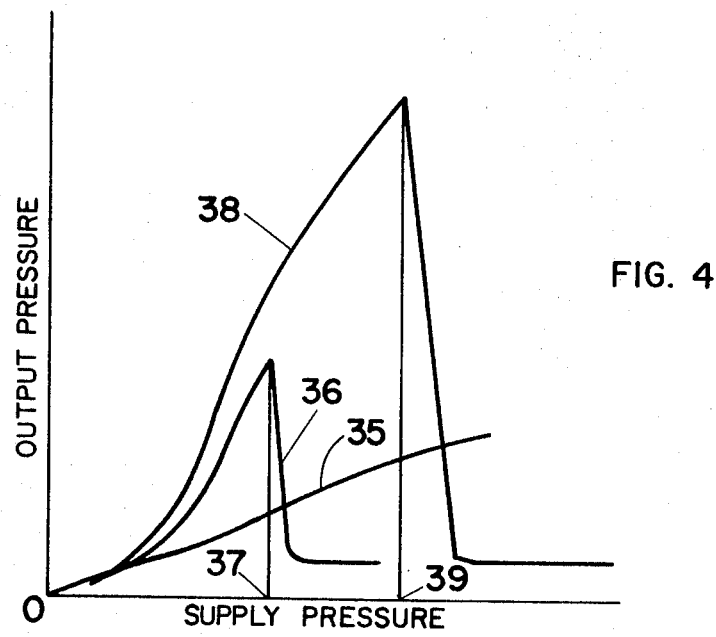
FIG. 4 shows several plots of supply pressure versus output pressure for an embodiment of the invention.

Referring to plot 35 of FIG. 4 representing a condition of operation of fluidic gate element 10 in which inlet end 28 of control access 26 is simply allowed to be open to atmosphere, it is observed that the output pressure is generally low, increasing somewhat with an increase in supply pressure as is consistent with a turbulent condition. When control access 26 is closed off as by shutting inlet 28, chamber 20 is thereby sealed off from condition influence, and in this condition, represented by plot 36 of FIG. 4, a laminar condition obtains over relatively low supply pressures up to point 37, while a turbulent condition obtains over higher supply pressures. This condition shows that the pressure within the sealed off chamber 20 is within the range of control pressures suitable for production of laminar flow over a range of low supply pressures up to point 37.

If a control pressure is held at a constant as supplied to inlet 28 of access 26, illustratively at 1.6 inch of water, a condition represented by plot 38 of FIG. 4 obtains, in which the output pressure remains laminar over an increase of supply pressures until a relatively high pressure 39, illustratively 19 inches of water, is reached, at which point turbulence obtains and the output pressure is reduced. It may be inferred that the operating range of control pressures suitable for producing a laminar condition of operation is relative to the particular supply pressure chosen.

Figure 5:
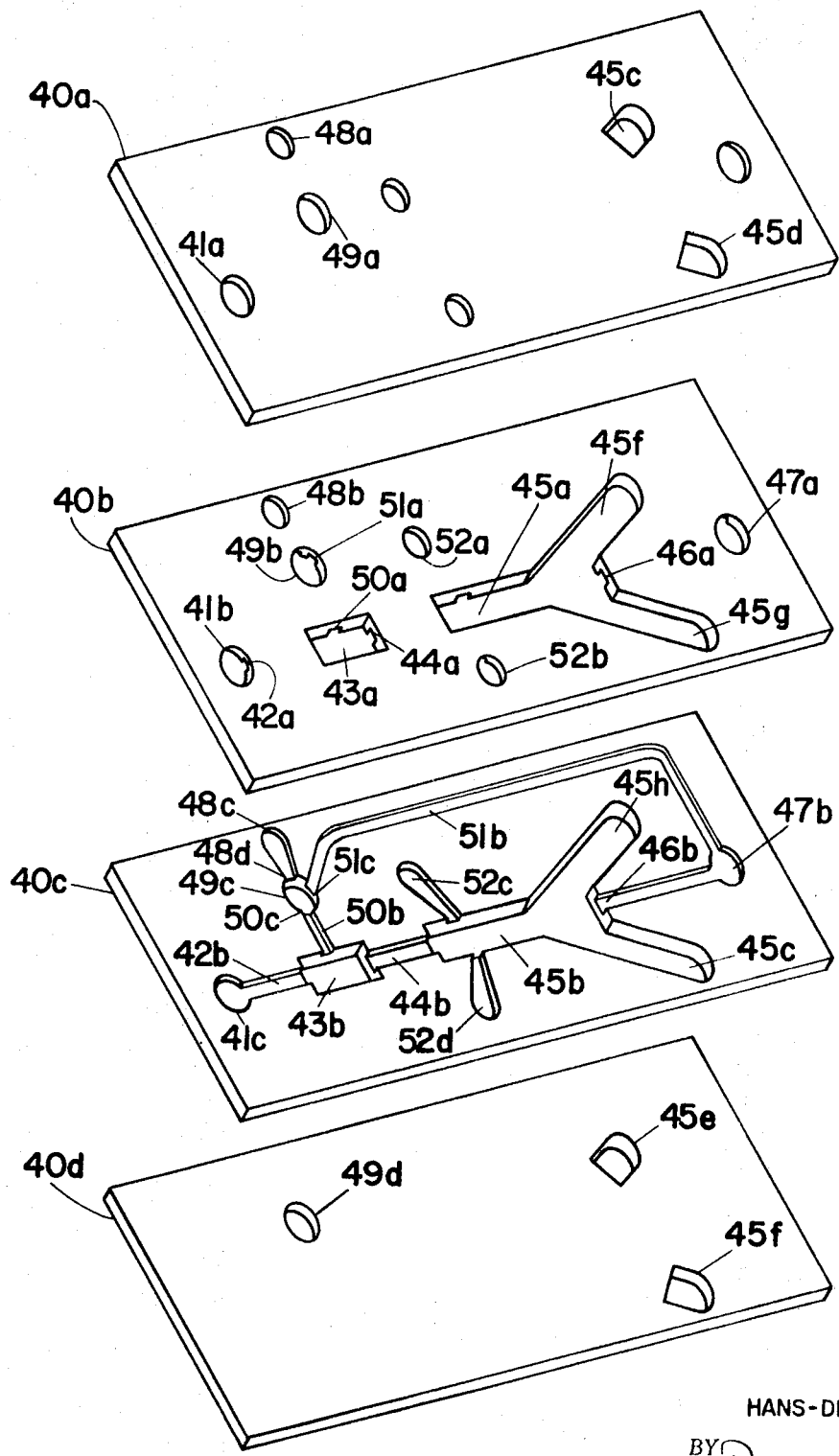
FIG. 5 is a three-dimensional exploded view of an etched configuration of an embodiment.

Referring to FIG. 5, an exploded three-dimensional view of an etched embodiment of the fluidic gate element of the invention is illustrated. The gate element illustrated is made up from four plates 40a, 40b, 40c, and 40d, which are adapted to be held sandwiched together by suitable means to thereby form an operative fluidic gate element configuration. Fluid pressure is supplied to supply access 41a, the supply being transferred through aperture 41b which is complemented by recess 41c to form a chamber leading to the fluidic gate upstream conduit which is formed by matching etched channels 41a and 41b. The upstream conduit formed by channels 42a and 42b empties into the controlling chamber formed by matching recesses 43a and 43b. The downstream flow conduit which is formed by matching etched channels 44a and 44b communicates from the control chamber. The downstream conduit formed by channels 44a and 44b empties into an atmospheric area formed by recess 45a including area arms 45f and 45g in plate 40b, and by matching recess 45b including area arms 45h and 45i in plate 40c. The recess thus formed having relief access to atmosphere through ports 45c and 45d in plate 40a and ports 45e and 45f in plate 40d. The receiver is formed of etched channels 46a and 46b, which receiver thus formed communicates with an output chamber formed of access 47a and matching etched recess 47b, access 47a providing the output signal from the fluidic gate element.

A control signal is applied to access 48a and is transferred to a chamber formed of aperture 48b and matching etched recess 48c having an elongated channel portion 48d for producing a control jet. Channel 48d communicates through a junction chamber open to atmosphere formed by aperture 49b together with aperture 49c, and open to atmosphere through ports 49a and 49b, and thence through the control conduit formed from etched channels 50a and 50b to the chamber formed by recess 43a and 43b. The control jet from channel 48d crosses atmospheric junction chamber to the control conduit formed by channels 50a and 50b thereby improving the control signal within the control chamber.

The configuration described above functions in a similar manner to the fluidic gate element described in connection with FIGS. 1 through 4. In addition, a latching passage formed of etched channels 51a and 51b is provided communicating between the receiver output chamber formed by access 47a and recess 47b, and the junction chamber formed from aperture 49b and 49c. The function of this latching passage is to provide the signal pressure appearing at the receiver output chamber 47a and 47b when the fluidic gate is producing a laminar flow from the conduit formed from channels 44a and 44b, to junction chamber 49b and 49c. The receiver output signal is communicated into junction chamber 49b and 49c at an angle determined by the orientation of terminus 51c of the latching passage 51a and 51b; this angle is adapted to impress a receiver pressure signal upon inlet 50c of control conduit 50a and 50b. This arrangement operates to latch the fluid gate element in its laminar mode even though the high pressure control signal may disappear from control access 48a.

Provision is made for unlatching the fluidic gate element by means of an unlatching signal applied to either access 52a or 52b, which accesses together with respective matching etched recesses 52c and 52d are adapted to produce jets interrupting the laminar stream projected from the passage formed by channels 44a and 44b to thereby cut off the projected flow reducing the receiver output signal which in turn removes the latching jet from terminus 51c, which thereby unlatches the gate element.

Figure 6:
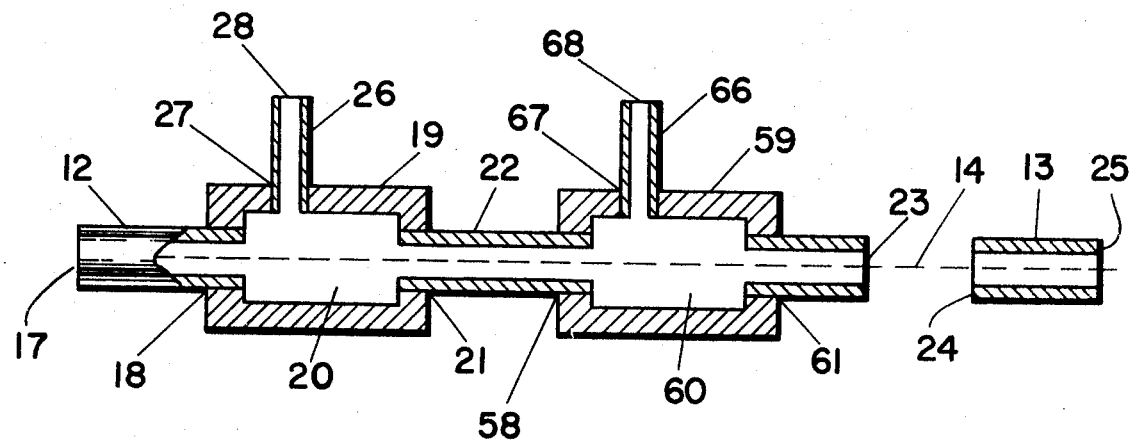
FIG. 6 is a cross-sectional view of an AND gate embodiment of the invention.

FIG. 6 shows a configuration of the invention forming an AND gate, in which two chambers 20 and 60 are serially positioned, each having a respective control access 26 and 66. In the operation of this embodiment, a laminar condition from flow projection terminus 23 is permitted when proper positive pressure signals are supplied to both inlets 28 and 68 of control accesses 26 and 66 respectively. Thus, a logical ONE must be applied to both control accesses 26 and 66 for a laminar ONE condition to obtain. If a logical ONE is absent from either control access, the receiver 13 output is low as a consequence of projected turbulence. Thus, the dual chamber 20—60 serial combination operates as a logical AND gate, in which all the inputs must be ONES in order for the receiver output to be a corresponding ONE. More than two chambers 20 and 60 may be located serially within a particular AND gate element, the number of chambers corresponding to the number of AND gate inputs desired.

What I claim is:

1. A fluidic element for performing a gating function comprising,
   first and second flow conduits each connected to a chamber enclosure opposite one another, said flow conduits being aligned on a common axis with each said conduit being individually shorter than a length required for a laminar flow to be formed thereby and projected therefrom over flow rates of interest and with said first flow conduit being responsive to a source of fluid supply pressure adapted to furnish a flow rate of interest producing turbulence projected from said first conduit into said chamber enclosure and with said chamber enclosure providing an enlarged volume having sections normal to said common axis greater than the cross sections of said conduits so that flow from said first conduit enters into said enlarged volume of said chamber enclosure, a control access responsive to a fluid control signal said control access communicating with said chamber for applying an elevated pressure thereto having the effect of placing first and second conduits in a controlled operative laminar flow producing relationship whereby a laminar flow is projected from said second flow conduit, and mans to distinguish the condition of a flow projected from said second flow conduit comprising a receiver conduit placed downstream from said second flow conduit for sensing the production of laminar flow from said second flow conduit as a consequence of a control signal of appropriate pressure applied to said chamber.

2. The fluidic element of claim 1 with latching means interconnecting said means to distinguish the condition of flow with said control access whereby a laminar flow projected condition sensed by said means to distinguish operates to impress an elevated latching pressure at said control access thereby latching said fluidic element in a laminar flow projected condition in the absence of a control signal application to said control access.

3. The fluidic element of claim 1 in a combination with a second chamber enclosure serially arranged therewith to form a fluidic element requiring simultaneous application of first and second control signals to both chambers respectively to enable the production of a laminar flow from the combination.